United States Patent [19]
Chodnekar et al.

[11] 3,887,586
[45] June 3, 1975

[54] ALLYL ETHERS

[75] Inventors: Madhukar Subraya Chodnekar, Basel; Albert Pfiffner, Pfaffhausen; Norbert Rigassi, Arlesheim; Ulrich Schwieter, Reinach; Milos Suchy, Pfaffhausen, all of Switzerland

[73] Assignee: Hoffmann-La Roche Inc., Nutley, N.J.

[22] Filed: Aug. 23, 1973

[21] Appl. No.: 390,962

Related U.S. Application Data

[63] Continuation-in-part of Ser. No. 108,599, Jan. 21, 1971, Pat. No. 3,781,309.

[30] Foreign Application Priority Data
Jan. 27, 1970 Switzerland.................... 1104/70

[52] U.S. Cl............................................. 260/348 R
[51] Int. Cl............................................... C07d 1/18
[58] Field of Search.............................. 260/348 R

*Primary Examiner*—Norma S. Milestone
*Attorney, Agent, or Firm*—Samuel L. Welt; Jon S. Saxe; Richard A. Gaither

[57] ABSTRACT

Allyl ethers or esters of aliphatic alcohols or acids wherein the aliphatic chain contains an epoxide group and at least 7 carbon atoms. The ethers and esters are useful in killing and preventing the proliferation of insects by upsetting their hormonal balance.

1 Claim, No Drawings

ALLYL ETHERS

CROSS REFERENCE TO RELATED APPLICATIONS

This application is a continuation-in-part of applicants' copending application Ser. No. 108,599, filed Jan. 21, 1971, entitled "Allyl Ethers and Esters", as originally filed and now U.S. Pat. No. 3,781,309.

SUMMARY OF THE INVENTION

In accordance with this invention, it has been found that compounds of the formula:

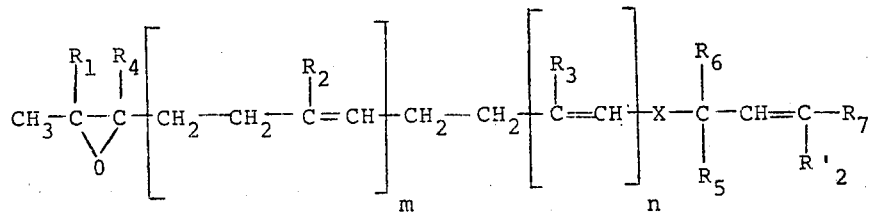

wherein $R_1$ is methyl or ethyl; $R_2$, $R'_2$ and $R_3$ are hydrogen, methyl or ethyl; $R_4$ is hydrogen or methyl; $R_5$, $R_6$ and $R_7$ are hydrogen, lower alkyl, lower alkenyl, lower alkynyl, lower aryl or lower aryl-lower alkyl;

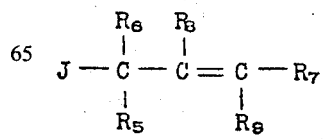

$R_{10}$ is hydrogen, methyl or ethyl; and $m$ and $n$ are integers of 0 to 1;
upset the hormone balance of pests such as insects prevent them from growing and reproducing.

The compounds of formula I are prepared by epo dizing a compound of formula:

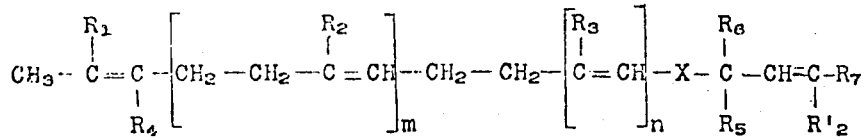

wherein $R_1$, $R_2$, $R'_2$, $R_3$, $R_4$, $R_5$, $R_6$, $R_7$, X, $m$ and $n$ as above.

The compounds of formulaa I are also prepar through the dehydrohalogenation of a halohydrin the formula:

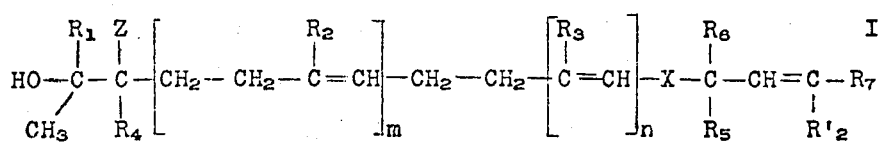

wherein $R_1$, $R_2$, $R'_2$, $R_3$, $R_4$, $R_5$, $R_6$, $R_7$ X, $m$ and $n$ as above, and Z is chlorine, bromine or iodine.

The compounds of formula I are further prepared reacting a compound of the formula:

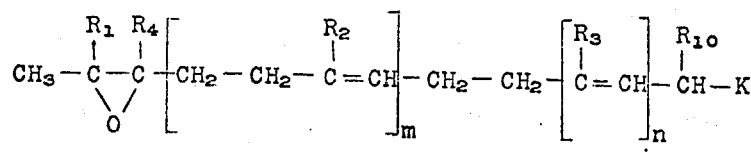

with a compound of the formula:

$$J—\underset{\underset{R_5}{|}}{\overset{\overset{R_6}{|}}{C}}—\underset{\underset{R_9}{|}}{\overset{\overset{R_8}{|}}{C}}=C—R_7$$

wherein $R_1$, $R_2$, $R_3$, $R_4$, $R_5$, $R_6$, $R_7$, $R_{10}$, $m$ and $n$ are as above; one of K and J is chlorine, bromine or iodine and the other is an alkali salt of the hydroxyl group; and $R_3$ is individually hydrogen and $R_9$ individually is hydrogen, methyl or ethyl or $R_8$ and $R_9$ taken together form an additional carbon-carbon bond; to give a compound of the formula:

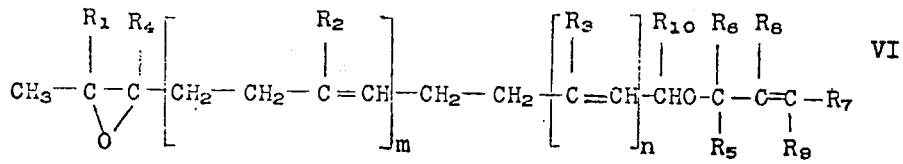

VI wherein $R_1$, $R_2$, $R_3$, $R_4$, $R_5$, $R_6$, $R_7$, $R_8$, $R_9$, $R_{10}$, $m$ and $n$ are as above.

In the case where $R_8$ and $R_9$ in the compound of formula VI form a carbon to carbon bond, this compound may be partially hydrogenated to a compound of formula I wherein both $R_8$ and $R_9$ are hydrogen. The compounds of formula I are still further prepared by reacting a compound of the formula:

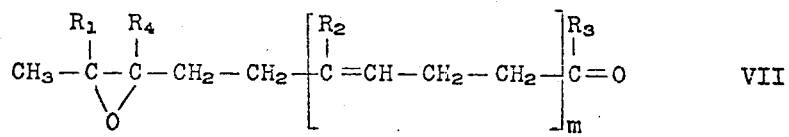

VII wherein $R_1$, $R_2$, $R_3$, $R_4$, and $m$ are as above; with a compound of the formula:

VIII wherein R is lower alkyl, phenyl, halophenyl and lower-alkoxyphenyl; and $R_5$, $R_6$, $R_7$, $R_8$ and $R_9$ are as above; to give a compound of the formula:

IX wherein $R_1$, $R_2$, $R_3$, $R_4$, $R_5$, $R_6$, $R_7$, $R_8$, $R_9$ and $m$ are as above.

In the case where $R_6$ and $R_9$ in the compound of formula IX form a carbon to carbon bond, this compound can be partially hydrogenated to a compound of formula I wherein both $R_8$ and $R_9$ are hydrogen.

DETAILED DESCRIPTION OF THE INVENTION

The term "halogen" or "halo", as used throughout this application, when not expressly stated otherwise, includes all four halogens, i.e., bromine, chlorine, fluorine and iodine. As used throughout this application, the term "lower alkyl" comprehends both straight-chain and branched chain saturated alkyl hydrocarbon groups containing from 1 to 6 carbon atoms, such as methyl, ethyl, propyl, isopropyl, etc. The term "lower alkenyl", as used herein, includes both straight and branched chain unsaturated alkenyl hydrocarbon groups having from 2 to 6 carbon atoms, such as vinyl, allyl, butenyl, pentenyl, and the like. The term "lower alkynyl," as used herein, includes both straight and branched chain, acetylenic unsaturated hydrocarbon having from 2 to 6 carbon atoms such as ethynyl, propargyl, butynyl, etc.

The term "lower aryl," as used throughout the application, signifies mono-nuclear, aromatic hydrocarbons such as phenyl, tolyl, etc. which can be unsubstituted or substituted in one or more positions with a lower alkylenedioxy, a halogen, a nitro, a lower alkyl, a lower alkoxy, a lower alkynyl, a lower alkynyloxy, a lower alkenyl or a lower alkenyloxy substituent, and polynuclear aryl groups such as naphthyl, anthryl, phenanthryl, azulyl, etc. which may be substituted with one or more of the aforementioned groups. The preferred lower aryl group is phenyl which can be either unsubstituted or substituted with one of the aforementioned groups. The term "lower aryl-lower alkyl" comprehends lower aryl-lower alkyl groups wherein aryl is defined as above and the alkyl is lower alkyl. The preferred lower aryl-lower alkyl group is benzyl. The lower aryl moiety of the lower aryl-lower alkyl group can be either unsubstituted or substituted with one of the aforementioned groups.

As used herein, the term "lower alkylenedioxy" designates lower alkylenedioxy groups having 1–4 carbon atoms such as methylene dioxy and ethylenedioxy. As used herein, the term "lower alkoxy" comprehends lower alkoxy groups containing from 1 to 6 carbon atoms, such as methoxy, propoxy, ethoxy, etc. The term "lower alkenyloxy," as utilized herein, comprehends lower alkenyloxy groups wherein lower alkenyl is defined as above. Among the preferred lower alkenyloxy groups are included vinyloxy, allyloxy, butenyloxy and pentenyloxy. The term "alkynyloxy," as used herein, comprehends the lower alkynyloxy groups wherein lower alkynyl is defined as above.

The compounds of formula I are useful in the control of pests such as *Ephestia Kuniella* (flour moth) and *Tenebrio molitor* (yellow meal worm). In contrast to most of the known pest-control agents which kill, disable or repel the pests by acting as contract-poisons and feed-poisons, the compounds of formula I above prevent maturation and proliferation of these pests by interfering with their hormonal system. In insects, for example, the transformation to the imago, the laying of viable eggs and the development of laid normal eggs is disturbed. Furthermore, the sequence of generations is interrupted and the insects are indirectly killed.

The compounds of formula I above are practically non-toxic to vertebrates. The toxicity of the compounds of formula I is greater than, 1,000 mg/kg body weight. Moreover, these compounds are readily degraded and the risk of accumulation is therefore excluded. Therefore, these compounds can be used without fear of danger in the control of pests in animals; plants; foods; and textiles.

Generally, in controlling invertebrate animals, the compounds of formula I above are applied to the material to be protected, e.g., foodstuffs, feeds, textiles, plants in amounts of from about $10^{-3}$ to $10^{-6}$ gm/cm². Generally, it is preferred to utilize the compounds of formula I above in a composition with a suitable inert carrier. Any conventional inert carrier can be utilized. Such a composition contains one or more compounds of formula I in a concentration from about 0.01 to about 0.5%, preferably 0.1%.

The compounds of formula I can, for example, be used in the form of emulsions, suspensions, dusting agents, solutions or aerosols. In special cases, the materials to be protected (e.g., foodstuffs, seeds, textiles and the like) can also be directly impregnated with the appropriate compound or with a solution thereof. Moreover, the compounds can also be used in a form which only releases them by the action of external influences (e.g., contact with moisture) or in the animal body itself.

The compounds of formula I above can be used as solutions suitable for spraying on the material to be protected which can be prepared by dissolving or dispersing these compounds in a solvent such as mineral oil fractions; cold tar oils; oils of vegetable or animal origins; hydrocarbons such as naphthalenes; ketones such as methyl ethyl ketone; or chlorinated hydrocarbons such as tetrachloroethylene, tetrachlorobenzene. and the like. The compounds of formula I above can also be prepared in forms suitable for dilution with water to form aqueous liquids such as, for example, emulsion concentrates, pastes or powders. The compounds of formula I above can be combined with solid carriers for making, dusting or strewing powders as, for example talc, kaolin, bentonite, calcium carbonate, calcium phosphate, etc. The compositions containing the compounds of formula I above can contain, if desired, emulsifiers, dispersing agents, wetting agents, or other active substances such as fungicides, bacteriacides, nematocides, fertilizers and the like. The materials which are to be protected act as bait for the insect. In this manner, the insect, by contacting the material impregnated with a compound of formula I above, also contacts the compound itself.

In accordance with this invention, the preferred compounds of formula I above are those where $R_5$, $R_6$ and $R_7$ are hydrogen, lower alkyl, lower alkenyl, lower alkynyl, lower aryl, or lower aryl-lower alkyl, where the lower aryls may be unsubstituted or substituted in one or more positions with a halogen, a lower alkyl, a lower alkyloxy or a nitro substituent. Particularly preferred are compounds of formula I above where: $R_5$, $R_6$ and $R_7$ are hydrogen, lower alkyl, lower alkenyl, lower alkynyl and lower aryl.

Among the most preferred compounds of formula I above are included:

1-(allyloxy)-4,5-epoxy-1,5-dimethyl-hexane;
1-(allyloxy)-6,7-epoxy-3,7-dimethyl-2-octene;
1-(allyloxy)-10,11-epoxy-3,7,11-trimethyl-2,6-dodecadiene;
1-(allyloxy)-10,11-epoxy-3,7,11-trimethyl-2,6-tridecadiene;
1-(allyloxy)-10,11-epoxy-7-ethyl-3,11-dimethyl-2,6-tridecadiene;
1-[1-(3,4-methylenedioxy-phenyl)-allyloxy]-6,7-epoxy-3,6,7-trimethyl-2-octene;
10,11-epoxy-3,7,10,11-tetramethyl-2,6-dodecadienoic acid allyl ester;
10,11-epoxy-3,7,11-trimethyl-2,6-dodecadienoic acid allyl ester;
10,11-epoxy-7-ethyl-3,11-dimethyl-2,6-tridecadienoic acid allyl ester;
6,7-epoxy-3,7-dimethyl-2-octenoic acid allyl ester;
1-(1,1-dimethyl-allyloxy)-6,7-epoxy-3,7-dimethyl-2-octene;
10,11-epoxy-3,7,11-trimethyl-[(3-methyl-2,4-pentadienyl)oxy]-2,6-dodecadiene;
10,11-epoxy-3,7,11-trimethyl-[3-methyl-2-penten-4-ynyl)-oxy]-2,6-dodecadiene; and
10,11-epoxy-3,7,11-trimethyl-2,6-dodecadienoic acid 3-methyl-2-penten-4-ynyl ester.

Among the starting materials which can be utilized to prepare the compounds of formula I are included;
allyl 1,5-dimethyl-4-hexenyl ether;
allyl 3,7-dimethyl-2,6-octadienyl ether;
3,7,11-trimethyl-2,6,10-dodecatrienoic acid allyl ester;
3,7,11-trimethyl-2,6,10-tridecatrienoic acid allyl ester;
3,7-dimethyl-2,6-octadienoic acid allyl ester;
3,7-dimethyl-2,6-octadienyl 1,1-dimethyl-allyl ether;
allyl 3,7,11-trimethyl-2,6,10-dodecatrienyl ether; and
3-methyl-2,4-pentadienyl 3,7,11-trimethyl-2,6,10-dodecatrienyl ether;
allyl 7-ethyl-3,11-dimethyl-2,6,10-tridecatrienyl ether.

One method for preparing a compound of formula I above involves epoxidizing a compound of formula II in an inert solvent with a peracid. For this purpose, a compound of formula II is dissolved in an inert solvent.

Any conventional inert solvent may be uzilized, with halogenated hydrocarbon solvents such as chloroform or carbon tetrachloride being preferred and methylene chloride being especially preferred. Although temperature and pressure are not critical, this reaction is preferably carried out at a temperature of from about 0°C. to about 40°C. Any conventional peracid can be utilized. Among the preferred peracids are included performic acid, peracetic acid, perbenzoic acid, perphthalic acid or pertungstic acid, with m-chloroperbenzoic acid being especially preferred.

Another method for preparing a compound of formula I above involves dehydrohalogenation a compound of formula III above with a base. For this purpose, the compound of formula III is dissolved in a conventional solvent, preferably in an alkanol where X is an oxymethylene group, methanol being especially preferred, or in an ether where X is a carbonyl group, diethyl ether being especially preferred. Any conventional base can be utilized, but the alkali metal alcoholates are preferred where X is an oxymethylene group, sodium methylate being especially preferred, and pulverized alkali hydroxides or potassium carbonate are preferred where X is a carbonyl group, potassium and sodium hydroxides being especially preferred. Although temperature and pressure are not critical, the reaction is preferrably carried out between about 0°C and 40°C. The epoxide of formula I is thus obtained in a smooth reaction.

The above method, involving the compounds of formula III as a reactant, offers the advantage that, with esters and ethers, only the terminal double bond is epoxidized. By contrast, in making compounds of formula I having more than one double bond from the compounds of formula II, the terminal double bond is not selectively converted into the corresponding epoxide using a peracid. Rather, a mixture of epoxides is generally obtained using a peracid which can be separated in a manner known per se by chromatography.

A further method of preparing compounds of formula I of the instant invention involves reacting the compounds of formula IV with the compounds of formula V. This reaction is generally carried out in any conventional inert organic solvent. Preferred inert organic solvents are benzene, toluene, tetrahydrofuran, dioxane, 1,2-dimethoxyethane, with tetrahydrofuran being especially preferred. To the reaction mixture is added an aprotonic solvent. Any conventional aprotonic solvent can be utilized, but hexamethyl phosphoric acid triamide is especially preferred. In carrying out this reaction, temperature and pressure are not critical, and any temperature of from about 0°C. to about the boiling point of the solvent can be utilized. Generally, the reaction is preferably carried out at the reflux temperature of the reaction mixture. In a particularly preferred embodiment, the invention is carried out in tetrahydrofuran at the reflux temperature which is 70°C. In carrying out this reaction, the hydroxyl group on either of the compounds of formula IV or V is initially converted by conventional techniques, in an inert solvent, into an alkali metal salt. One method of converting to the alkali metal salt is by reacting the compound of either formula IV or V, where either J or K is a hydroxyl group with a suitable base such as an alkali metal hydride, e.g. sodium hydride utilizing tetrahydrofuran as a solvent. This alkali metal salt is then reacted with the halide of either compound IV or V to yield compound VI.

A still further method for preparing a compound of formula I of the instant invention involves reacting a carbonyl compound of formula VII with a phosphine oxide of formula VIII to obtain a compound of formula IX. Although temperature and pressure are not critical, this reaction is preferably effected in a temperature range of 0°C. to about 40°C. The reaction is carried out in the presence of a base and in an inert solvent. Any conventional base and inert organic solvent can be utilized in this reaction. The preferred bases are, however, the alkali metal hydrides, such as sodium hydride, preferably dissolved in benzene, toluene, dimethylformamide, tetrahydrofuran, dioxane or 1,2-dimethoxyethane and the alkali metal alcoholates, such as sodium methylate, preferably dissolved in an alcohol, such as methanol. In a particularly preferred reaction, a compound of formula VII is reacted with a phosphine oxide of formula VIII in the presence of 2 moles of sodium hydride in absolute tetrahydrofuran, excess sodium hydride being decomposed by adding absolute alkanol prior to the working up.

When $R_8$ and $R_9$ form an additional carbon to carbon bond in compounds of formula VI or IX, the compounds of formula I can be formed by selective hydrogenation of the acetylenic bond in the compound of formula VI or IX to an olefin double bond. For this purpose, the acetylenically unsaturated compound is dissolved in an inert solvent, preferably a high-boiling petroleum ether, and is partially hydrogenated in the presence of a partially inactivated catalyst, such as a lead/palladium catalyst deactivated with quinoline; Helv. Chim Acta 35, 446 (1952); Hoppe-Seylers Z. Phsiol. Chem. 295,290 (1935).

The starting materials of formula II, used in the process in accordance with the instant invention, can be obtained according to several procedures. One method of obtaining compounds of formula II wherein X is oxymethylene consists of reacting a compound of the formula:

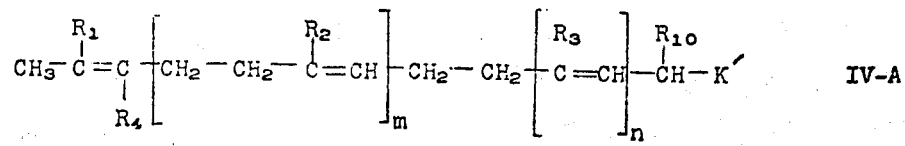

IV-A with a compound of the formula:

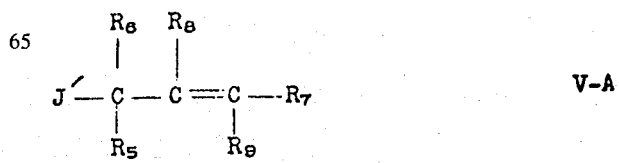

V-A wherein $R_1$, $R_2$, $R_3$, $R_4$, $R_5$, $R_6$, $R_7$, $R_8$, $R_9$, $R_{10}$, $m$ and $n$ are as above and one of K' and J' is a halogen and the other is an alkali salt of the hydroxy group.

This reaction is carried out in the same manner as described hereinabove with respect to reacting compounds of formula IV with compounds of formula V. This reaction can be effected in any conventional inert organic solvent, preferably benzene, toluene, dioxane, 1,2-dimethoxyethane or tetrahydrofuran. Although the temperature and pressure of the reaction is not critical, a temperature range lying between 0°C. and the boiling point of the solvent concerned is preferred. An aprotonic solvent such as hexamethyl phosphoric acid triamide is preferably also added to the reaction mixture.

One method of obtaining compounds of formula II wherein X is oxycarbonyl consists of reacting a compound of the formula:

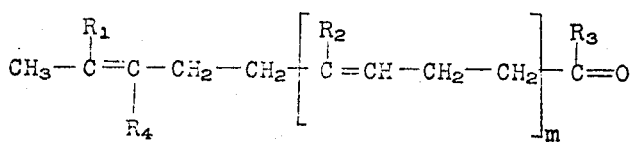

VII-A wherein $R_1$, $R_2$, $R_3$, $R_4$ and $m$ are as above; with a compound of formula VIII. This reaction is carried out in the same manner as described hereinabove with respect to reacting compounds of formula VII with compounds of formula VIII. This reaction is expediently carried out in the presence of a base, preferably dissolved in an inert organic solvent.

Another method for obtaining compounds of formula II wherein X is oxycarbonyl consists of esterifying an acid of the formula:

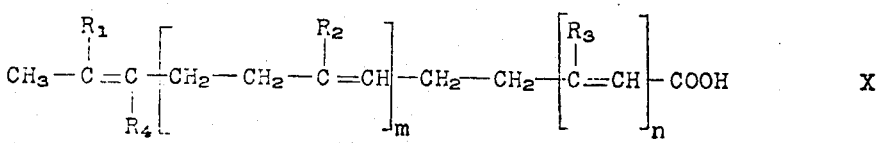

X wherein $R_1$, $R_2$, $R_3$, $R_4$, $m$ and $n$ are as above; with a compound of formula V wherein J is a hydroxyl group. Any of the conventional methods of esterifying an acid with an alcohol can be utilized in carrying out this reaction. In accordance with a preferred embodiment of this invention, the acid of formula X is reacted with a halogenating agent, such as thionyl chloride, thionyl bromide, phosphorous trichloride, phosphorous oxychloride etc., with thionyl chloride being preferred. The halogenation of the acid of formula X is carried out in the presence of an inert organic solvent, such as petroleum ether, benzene, hexane, etc. within a temperature range from about 0°C to about the boiling point of the reaction mixture. This halogenation reaction is carried out in the presence of an organic amine base. Any of the conventional organic amine bases such as pyridine, triethylamine, quinoline, etc. can be used, but pyridine is preferred. The resulting acid halide can then be reacted by conventional means with the compound of formula V, wherein J is a hydroxy group, to produce the compound of formula II, wherein X is oxycarbonyl. Generally, this reaction is carried out in an inert organic solvent, such as benzene, toluene, hexane, isooctane, chloroform, carbon tetrachloride or ethylene glycol dimethyl ether within a temperature range from about 0°C to about the boiling point of the reaction mixture. This reaction is also carried out in the presence of an acid binding agent such as pyridine, triethyl amine, quinoline, with pyridine being preferred, to give the desired allyl or propargyl ester. The propargyl ester can be partially hydrogenated to a compound of formula II.

Starting compounds of formula III are obtained by hydroxyhalogenating a compound of formula II. This hydroxyhalogenation can be carried out by conventional procedures. In accordance with a preferred embodiment of this invention, the compound of formula II is suspended in water and treated with an equal amount of an inert organic solvent to form a homogeneous, concentrated solution. Any conventional inert organic solvent such as tetrahydrofuran, dioxane, 1,2-dimethoxyethane, etc., preferably tetrahydrofuran can be utilized. This solution can be treated with a conventional hydroxyhalogenating agent to hydroxyhalogenate the compound of formula II. If, for example, a compound of formula III is desired wherein Z is bromine, N-bromo-succinimide is introduced portionwise into such a solution in a temperature range of from about 0°C. to 40°C. If compounds of formula III are desired wherein Z is chlorine or iodine, N-chloro-succinimide or N-iodo-succinimide is correspondingly used. A preferred temperature range for carrying out this reaction lies between 0°C. and 5°C.

The compounds of formula I of the instant invention exist as a cis/trans isomer mixture. The mixture can, for example, be separated into the isomeric forms by adsorption on a material with selective acidity. For example, isomer mixture can be dissolved in an inert organic solvent, such as hexane, diethyl ether or acetic acid ethyl ester, and adsorbed on Kieselgel. The isomers adsorbed in different zones can be eluted with one of the solvents or solvent mixtures mentioned hereinbefore and isolated. The isomer mixture can, in individual cases, also be separated by fractional distillation or optionally preparative thin layer chromatography.

The following examples illustrate the invention. All temperatures are stated in degrees Centigrade. Nujol is mineral oil, and the percent of hydride in the mineral oil suspension is given as percent by weight.

EXAMPLE 1

2.4 g of sodium hydride (50% Nujol suspension) is washed twice with hexane and overlaid with 10 ml of absolute tetrahydrofuran and, with stirring and ice-cooling, 11.9 g of 10,11-epoxy-3,7,11-trimethyl-2-cis/trans, 6-cis-dodecadien-1-ol in 10 ml of absolute tetrahydrofuran is added dropwise, and the mixture is further stirred at room temperature for 1 hour. With ice-cooling, 7 g of allyl bromide and 20 ml of hexamethyl phosphoric acid triamide are successively added dropwise, and the mixture is further stirred at 50°C. for 3 hours. The cooled reaction mixture is poured onto ice-water and exhaustively extracted with hexane. The combined hexane extracts are worked up by washing with saturated aqueous sodium chloride solution, followed by drying over sodium sulphate and then filtering and evaporating. After working up in the preceding manner, the residues are chromatographed on Kieselgel with hexane and acetic ester (4:1 parts by volume) to yield pure 1-(allyloxy)-10,11-epoxy-3,7,11-trimethyl-2-cis/trans, 6-cis-dodecadiene. A sample is distilled in the bulb-tube. Boiling point ca 120°/10$^{-3}$ mmHg; $n_D^{20} = 1.4785$.

EXAMPLE 2

A solution of 4.4 g of sodium in 95.5 ml of absolute methanol is added dropwise with ice-cooling to a solution of 73 g of 3-bromo-2,6,10-trimethyl-12-[(trans-3-methyl-2-penten-4-ynyl)-oxy]-6-cis, 10-cis/trans-dodecadien-2-ol in 95.5 ml of absolute methanol and the mixture is subsequently further stirred for 0.5 hours. The reaction mixture is poured onto ice-water, exhaustively extracted with diethyl ether and worked up as described in Example 1. By chromatography on Kieselgel with hexane and diethyl ether (4:1 parts by volume), there is obtained pure 10,11-epoxy-3,7,11-trimethyl-1-[(trans-3-methyl-2-penten-4-ynyl)-oxy]-2-cis/trans, 6-cis-dodecadiene which decomposes on distillation in high vacuum. A sample is distilled in the bulb-tube; boiling point ca 140°–145°/10$^{-3}$ mmHg; $n_D^{20} = 1.4974$.

The starting material is obtained as follows:

39 g of sodium hydride (50% Nujol suspension) is washed twice with hexane and overlaid with 400 ml of tetrahydrofuran, and, with stirring and ice-cooling, 78.2 g of trans-3-methyl-2-penten-4-yn-1-ol is added dropwise, and the mixture is further stirred at room temperature for 1 hour. 232 g of 2-cis/trans, 6-cisfarnesyl bromide and 270 ml of hexamethyl phosphoric acid triamide are subsequently successively added dropwise, and the mixture is stirred at 50° for 3 hours and worked up as described in Example 1. By chromatography on Kieselgel with hexane and diethyl ether (97.5:2.5 parts by volume), there is obtained pure trans-3-methyl-2-penten-4-ynyl 3,7,11-trimethyl-2-cis/trans, 6-cis,10-dodecatrienyl ether. A sample is distilled in the bulb-tube. Boiling point ca 120°–127°/0.0015 mmHg; $n_D^{20} = 1.5012$.

89.3 g of N-bromosuccinimide is added portionwise with ice-cooling to a homogeneous solution of 134 g of trans-3-methyl-2-penten-4-ynyl 3,7,11-trimethyl-2-cis/trans, 6-cis,10-dodecatrienyl ether in 1300 ml of tetrahydrofuran and 208 ml of water. The mixture is further stirred for 4 hours with ice-cooling and worked up as described in Example 1. By chromatography on Kieselgel with hexane and diethyl ether (4:1 parts by volume), there is obtained pure 3-bromo-2,6,10-trimethyl-12-[(trans-3-methyl-2-penten-4-ynyl)-oxy]-6-cis-10-cis/trans-dodecadien-2-ol which decomposes on distillation in high vacuum. $n_D^{20} = 1.5213$ (sample dried in high vacuum at 50° for 3 hours).

EXAMPLE 3

0.6 ml of quinoline and 0.6 g of Lindlar catalyst are added to a solution of 6 g of 10,11-epoxy-3,7,11-trimethyl-1-[(trans-3-methyl-2-penten-4-ynyl)-oxy]-2-cis/trans, 6-cis-dodecadiene in 60 ml of petroleum ether (b.p. 80°–110°C), and the mixture is hydrogenated up to the uptake of the theoretical amount of hydrogen, filtered from the catalyst and evaporated. In order to remove the quinoline, the reaction mixture is worked up by chromatographing on Kieselgel with hexane and diethyl ether (4:1 parts by volume) and a sample distilled in the bulb-tube. There is obtained 10,11-epoxy-3,7,11-trimethyl-[(trans-3-methyl-2,4-pentadienyl)-oxy]-2-cis/trans, 6-cis-dodecadiene. Boiling point ca 120°/10$^{-3}$ mmHg; $n_D^{20} = 1.4967$.

EXAMPLE 4

0.5 ml of quinoline and 0.5 g of Lindlar catalyst are added to a solution of 5 g of 1-(propynyloxy)-6,7-epoxy-3,7-dimethyl-2-cis/trans-octene in 50 ml of petroleum ether (b.p. 80°–110°C), and the mixture is hydrogenated up to the uptake of the theoretical amount of hydrogen filtered from the catalyst, evaporated and worked up as described in Example 3. 1-(allyloxy)-6,7-epoxy-3,7-dimethyl-2-cis/trans-octene, obtained thereby, boils at 60°/0.08 mmHg; $n_D^{20} = 1.4632$.

EXAMPLE 5

43.3 g of m-chloroperbenzoic acid are added portionwise with ice-cooling to a solution of 33 g of allyl 3,7-dimethyl-2-cis/trans, 6-octadienyl ether in 350 ml of methylene chloride, and the mixture is further stirred with ice-cooling for 2 hours, subsequently diluted with 250 ml of methylene chloride and successively washed with ice-cold 1-N caustic soda and saturated aqueous sodium chloride solution, dried over sodium sulphate, filtered and evaporated. By chromatography on Kieselgel with hexane and diethyl ether (4:1 parts by volume) and subsequent distillation, there is obtained pure 1-(allyloxy)-6,7-epoxy-3,7-dimethyl-2-cis/trans-octene; boiling point 70°–72°/0.1 mmHg; $n_D^{20} = 1.4633$.

The starting material is obtained as follows:

48 g of sodium hydride (50% Nujol suspension) is washed twice with hexane and subsequently overlaid with 500 ml of absolute tetrahydrofuran. With stirring and ice-cooling, 58 g of allyl alcohol is added dropwise and the mixture is stirred at room temperature for 1 hour. With ice-cooling, 220 g of 2-cis/transgeranyl bromide and 400 ml of hexamethyl phosphoric acid triamide are successively added dropwise, and the mixture is heated at reflux for 3 hours. The mixture is subsequently worked up as described in Example 1 and fractionally distilled. Boiling point 51°/0.015 mmHg; $n_D^{20} = 1.4695$.

EXAMPLE 6

9 g of m-chloroperbenzoic acid (93%) is added portionwise with ice-cooling to 9.3 g of 2-cis/trans-geranium acid allyl ester in 100 ml of methylene chloride, and the mixture is further stirred with ice-cooling for 2 hours. The mixture is then worked up by being diluted with 100 ml of methylene chloride, washed initially with ice-cold 1-N caustic soda and thereafter with saturated aqueous sodium chloride solution, dried over sodium sulphate, filtered and evaporated. After being worked up in the preceding manner, the residues are chromatographed on Kieselgel with hexane and diethyl ether (4:1 parts by volume) and subsequent distilled to obtain pure 6,7-epoxy-3,7-dimethyl-2-cis/transoctenoic acid allyl ester; boiling point 81°–84°/0.05 mmHg; $n_D^{20} = 1.4728$.

The starting material is obtained as follows:

20.2 g of thionyl chloride is added dropwise with ice-cooling to a solution of 25.2 g of geranium acid and 13.5 g of pyridine in 150 ml of absolute ether, and the mixture is stirred at room temperature for 1 hour with the exclusion of moisture. The precipitated pyridine hydrochloride is rapidly filtered off, rinsed with hexane and the reaction solution evaporated in vacuum. The unpurified geranium acid chloride is taken up in 100 ml of absolute benzene and, with ice-cooling, added dropwise to a solution of 9.3 g of allyl alcohol and 13.5 g of pyridine in 200 ml of hexane and 80 ml of benzene and further stirred at room temperature for 1 hour. The reaction mixture is poured onto ice-cold, dilute hydrochloric acid, the organic phase is separated off, and the aqueous-hydrochloric acid phase is extracted twice with hexane. The combined organic phases are successively washed neutral with saturated aqueous sodium bicarbonate solution and saturated aqueous sodium chloride solution, dried over sodium sulphate, filtered off and evaporated. By chromatography on Kieselgel with hexane and diethyl ether (9:1 parts by volume) and subsequent distillation, there is obtained pure 2-cis/transgeranium acid allyl ester; boiling point 70°/0.01 mmHg; $n_D^{20} = 1.4800$.

EXAMPLE 7

10.3 g of m-chloroperbenzoic acid is added portionwise with ice-cooling to 12.6 g of 3,7,11-trimethyl-2-cis/trans, 6-trans, 10-dodecatrienoic acid trans-3-methyl-2-penten-4-ynyl ester in 120 ml of methylene chloride. The mixture is further stirred with ice-cooling for 2 hours and worked up and chromatographed as described in Example 6. The pure 10,11-epoxy-3,7,11-trimethyl-2-cis/trans, 6-trans-dodecadienoic acid trans-3-methyl-2-penten-4-ynyl ester obtained boils in the bulb-tube with decomposition at ca 150°/10$^{-3}$ mmHg; $n_D^{20} = 1.5020$.

The starting material is obtained as follows:

24.6 g of 3,7,11-trimethyl-2-cis/trans, 6-trans, 10-dodecatrienoic acid chloride in 70 ml of absolute benzene is added dropwise with ice-cooling to a solution of 9.6 g of trans-3-methyl-2-penten-4-yn-1-ol and 8.15 ml of absolute pyridine in 200 ml of hexane and 55 ml of absolute benzene, further stirred at room temperature for 1 hour and worked up and chromatographed as described in Example 6, second part. A sample of the pure 3,7,11-trimethyl-2-cis/trans, 6-trans, 10-dodecatrienoic acid trans-3-methyl-2-penten-4-ynyl ester boils in the bulb-tube at ca 130°/10$^{-3}$ mmHg; $n_D^{20} = 1.5098$.

EXAMPLE 8

11.5 g of m-chloroperbenzoic acid is added portionwise with ice-cooling to 12.5 g of 3,7-dimethyl-2,6-octadienyl 1,1-dimethyl-2-propenyl ether in 130 ml of methylene chloride. The mixture is stirred for 2 hours, thereafter diluted with 130 ml of methylene chloride and successively washed with ice-cold 1-N caustic soda and saturated aqueous sodium chloride solution, dried over sodium sulphate and evaporated. The residue is chromatographed on Kieselgel with hexane and diethyl ether (9:1 parts by volume). There is obtained pure 6,-7-epoxy-3,7-dimethyl-1-[(1,1-dimethyl-2-propenyl)-oxy]-2-octene. Boiling point 80°/0.15 mmHg; $n_D^{20} = 1.4619$.

The starting material is obtained as follows:

9.6 g of sodium hydride (50% Nujol suspension) is washed twice with hexane and overlaid with 80 ml of absolute tetrahydrofuran. With ice-cooling, 17.2 g of 2-methyl-3-buten-2-ol in 150 ml of absolute tetrahydrofuran is added dropwise, and the mixture is stirred at room temperature for 1 hour. 23 g of geranyl bromide and thereafter, with occasional ice-cooling, 80 ml of hexamethyl phosphoric acid triamide are subsequently added dropwise, and the mixture is heated at reflux for 2 hours. The cooled reaction mixture is poured onto saturated aqueous sodium chloride solution, worked up as described in Example 1, and chromatographed on Kieselgel with hexane and diethyl ether (95:5 parts by volume). The 3,7-dimethyl-2,6-octadienyl 1,1-dimethyl-2-propenyl ether boils at 58°–59°/0.08 mmHg; $n_D^{20} = 1.4673$.

EXAMPLE 9

2.5 g of m-chloroperbenzoic acid (93%) is added portionwise with stirring and ice-cooling to 3.8 g of 3,6-,7-trimethyl-1-[(α-vinylpiperonyl)oxy]-2-cis/trans, 6-octadiene in 40 ml of methylene chloride, and the mixture is further stirred with ice-cooling for 2 hours. The reaction mixture is subsequently diluted with 40 ml of methylene chloride and washed with ice-cold 1-N caustic soda and saturated aqueous sodium chloride solution, dried over sodium sulphate and evaporated. By chromatography on Kieselgel with hexane and diethyl ether (4:1 parts by volume), there is obtained pure 6,7-epoxy-3,6,7-trimethyl-1-[(α-vinylpiperonyl)oxy]-2-cis/trans-octene. A sample boils in the bulb-tube at ca 135°/0.001 mmHg; $n_D^{20} = 1.5230$.

The starting material is obtained as follows:

4.4 g of sodium hydride (50% Nujol suspension) is washed with hexane and overlaid with 40 ml of absolute tetrahydrofuran. With ice-cooling, 16 g of α-ethynylpiperonyl alcohol in 120 ml of absolute tetrahydrofuran is added dropwise, and the mixture is further stirred at room temperature for 1 hour. 21 g of 3,6,7-trimethyl-2-cis/trans, 6-octadienyl-1-bromide and 40 ml of hexamethyl phosphoric acid triamide are subsequently successively added dropwise with ice-cooling, and the mixture is stirred at room temperature for 1 hour, poured onto saturated aqueous sodium chloride solution, and exhaustively extracted with diethyl ether. The ether solution is washed with saturated aqueous sodium chloride solution, dried and evaporated. By chromatography on Kieselgel with hexane and diethyl ether (9:1 parts by volume), there is obtained pure 3,6,7-trimethyl-1-[(α-ethynylpiperonyl)oxy]-2-cis/trans, 6-octadiene; $n_D^{20} = 1.5366$.

0.7 ml of quinoline and 0.7 g of Lindlar catalyst are added to 6.6 g of 3,6,7-trimethyl-1-[(α-ethynylpiperonyl)oxy]-2-cis/trans, 6-octadiene in 60 ml of high-boiling petroleum ether-acetic ester (3:1), and the mixture is hydrogenated up to the uptake of the theoretical amount of hydrogen. The reaction solution is subsequently filtered off from the catalyst and successively washed with ice-cold aqueous 1-N hydrochloric acid, with aqueous sodium bicarbonate solution and saturated aqueous sodium chloride solution and dried over sodium sulphate and evaporated. By chromatography on Kieselgel with hexane and diethyl ether (85:15 parts by volume), there is obtained pure 3,6,7-trimethyl-1-[(α-vinylpiperonyl)-oxy]-2-cis/trans, 6-octadiene. A sample boils in the bulb-tube at ca 82°/6 mmHg; $n_D^{20} = 1.4388$.

EXAMPLE 10

14.6 g of m-chloroperbenzoic acid (93%) is added portionwise with stirring and ice-cooling to 12 g of allyl 1,5-dimethyl-4-hexenyl ether in 120 ml of methylene chloride, and the mixture is further stirred with ice-cooling for 1 hour. The reaction mixture is subsequently diluted with 120 ml of methylene chloride and washed with ice-cold 1-N caustic soda and saturated aqueous sodium chloride solution, dried over sodium sulphate and evaporated. By chromatography on Kieselgel with hexane and diethyl ether (9:1 parts by volume), there is obtained pure 1-(allyloxy)-4,5-epoxy-1,5-dimethyl-hexane. Boiling point ca 80°/0.005 mmHg; $n_D^{20} = 1.5230$.

The starting material is obtained as follows:

9.6 g of sodium hydride (50% Nujol suspension) is washed with hexane and overlaid with 100 ml of absolute tetrahydrofuran. With ice-cooling, 25.4 g of 6-methyl-5-hepten-2-ol is added dropwise, and the mixture is further stirred at room temperature for 1 hour. 24.2 g of allyl bromide and 70 ml of hexamethyl phosphoric acid triamide are subsequently successively added dropwise, and the mixture is stirred at room temperature for 16 hours, poured onto ice-water, exhaustively extracted with diethyl ether, washed with saturated aqueous sodium chloride solution and evaporated. By chromatography on Kieselgel with hexane and diethyl ether (9:1 parts by volume) and subsequent distillation, there is obtained pure allyl 1,5-dimethyl-4-hexenyl ether. Boiling point 63°–64°/7 mmHg; $n_D^{20} = 1.4442$.

EXAMPLE 11

To a solution of 5.8 g 1-(propynyloxy)-10,11-epoxy-3,7,10,11-tetramethyl-2,6-dodecadiene (cis and trans-mixture) in 60 ml of high-boiling petroleum ether is added 0.6 ml of quinoline and 0.6 g of Lindlar catalyst. The mixture is hydrogenated up to the uptake of the theoretical amount of hydrogen, filtered to remove the catalyst, and then evaporated to dryness. In order to remove the quinoline, the reaction mixture is chromatographed on Kieselgel with hexane and diethyl ether (4:1 parts by volume) and distilled. There is obtained 1-(allyloxy)-10,11-epoxy-3,7,10,11-tetramethyl-2,6-dodecadiene (cis and trans-mixture). Boiling point 115°–116°C/0.035 mmHg; $n^{20}_D = 1.4779$.

EXAMPLE 12

To a mixture of 10 g 3-bromo-2,6,10-trimethyl-12-allyloxy-6,10-dodecadien-2-ol (cis and trans-mixture) in 14 ml absolute methanol is added dropwise, with ice-cooling, a solution of 645 mg sodium in 14 ml absolute methanol and the mixture is subsequently further stirred for 1 hour. The reaction mixture is poured onto ice-water, exhaustively extracted with diethyl ether, and worked up as described in Example I. By chromatography on Kieselgel with hexane and diethyl ether (4:1 parts by volume), there is obtained pure 1-(allyloxy)-10,11-epoxy-3,7,11-trimethyl-2,6-dodecadiene (cis and trans-mixture). Boiling point 99°–100°C/0.002 mmHg; $n_D^{20} = 1.4751$.

The starting material is obtained as follows:

4.8 g of sodium hydride (50% Nujol suspension) is washed twice with hexane and overlaid with 57 ml of absolute tetrahydrofuran. With stirring and ice-cooling, 5.8 g allyl alcohol is added dropwise, and the mixture is further stirred at room temperature for 1 hour. 28.5 g farnesyl bromide (cis and trans-mixture) and 40 ml hexamethyl-phosphoric acid-triamide are subsequently, successively added dropwise, and the mixture is stirred at room temperature for 2 hours and worked up as described in Example 1. By chromatography on Kieselgel with hexane and diethyl ether (9:1 parts by volume) is obtained pure allyl-(3,7,11-trimethyl-2,6,10-dodecatrienyl)-ether (cis and trans-mixture). Boiling point 94°–95°C/.001 mmHg; $n_D^{20} = 1.4807$.

To a homogeneous solution of 14.5 g allyl-(3,7,11-trimethyl-2,6,10-dodecatrienyl)-ether (cis and trans-mixture) in 155 ml tetrahydrofuran and 25 ml water is added portionwise with ice-cooling 12.4 g N-bromosuccinimide. The mixture is further stirred under ice-cooling for 6 hours and worked up as described in Example 1. By chromatography on Kieselgel with hexane and diethyl ether (4:1 parts by volume) is obtained pure 3-bromo-2,6,10-trimethyl-12-allyloxy-6,10-dodecadiene-2-ol (cis and trans-mixture). $n_D^{20} = 1.5022$.

EXAMPLE 13

A solution of 650 mg sodium in 16 ml absolute methanol is added dropwise with ice-cooling to a solution of 9.33 g 4-bromo-3,7,11-trimethyl-13-allyloxy-7,11-tridecadien-3-ol (cis and trans-mixture) in 16 ml absolute methanol, and the mixture is subsequently further stirred for 1 hour. The reaction mixture is poured onto ice-water, exhaustively extracted with diethyl ether and worked up as described in Example 1. By chromatography on Kieselgel with hexane and diethyl ether (4:1 parts by volume), there is obtained pure 1-(allyloxy)-10,11-epoxy-3,7,11-trimethyl-2,6-tridecadiene (cis and trans-mixture). Boiling point ca 120°C/.005 mmHg; (bulb-tube). $n_D^{20} = 1.4768$.

The starting material is obtained as follows:

4.5 g sodium-hydride (50% Nujol suspension) is washed twice with hexane and overlaid with 17 ml of absolute tetrahydrofuran. With stirring and cooling, 20.2 g 3,7,11-trimethyl-2,6,10-tridecatriene-1-ol (cis and trans-mixture) is added dropwise, and the mixture is further stirred for 1 hour at room temperature. 10.9 g allylbromide and 34 ml hexamethyl phosphoric acid triamide are subsequently, successively added dropwise, and the mixture is further stirred at room temperature for 16 hours and worked up as described in Example 1. By chromatography on Kieselgel with hexane and diethyl ether (4:1 parts by volume) is obtained pure allyl-(3,7,11-trimethyl-2,6,10-tridecatrienyl)-ether (cis and transmixture). Boiling point 87°C/.001 mmHg; $n_D^{20} = 1.4813$.

8.9 g N-bromosuccinimide is added portionwise with ice-cooling to a homogeneous solution of 13.8 g allyl-(3,7,11-trimethyl-2,6,10-tridecatrienyl)-ether (cis and trans-mixture) in 145 ml tetrahydrofuran and 23 ml water. The mixture is further stirred with ice-cooling for 6 hours and worked up as described in Example 1. By chromatography on Kieselgel with hexane and diethyl ether (4:1 parts by volume), there is obtained pure 4-bromo-3,7,11-trimethyl-13-allyloxy-7,11-tridecadiene-3-ol. (cis and trans-mixture). $n_D^{20} = 1.5035$.

EXAMPLE 14

A solution of 350 mg sodium in 8.5 ml absolute methanol is added dropwise with ice-cooling to a solution of 5.08 g 4-bromo-7-ethyl-3,11-dimethyl-13-allyloxy-7,11-tridecadien-3-ol (cis and trans-mixture) in 8.5 ml absolute methanol. The mixture is subsequently, further stirred for 1 hour, poured onto ice-water, exhaustively extracted with diethyl ether worked up as described in Example 1. By chromatography on Kieselgel with hexane and diethyl ether (4:1 parts by volume), there is obtained pure 1-(allyloxy)-10,11-epoxy-7-ethyl-3,11-dimethyl-2,6-tridecadiene (cis and trans-mixture). Boiling point ca 125°C/.001 mmHg; $n_D^{20} = 1.4772$.

The starting material is obtained as follows:

2.44 g sodium hydride (50% Nujol suspension) is washed twice with hexane and overlaid with 11 ml absolute tetrahydrofuran. With stirring and ice-cooling, a solution of 12.7 g 7-ethyl-3,11-dimethyl-2,6,10-tridecatrien-1-ol (cis and trans-mixture) in 11 ml absolute tetrahydrofuran is added dropwise, and the mixture is further stirred at room temperature for 1 hour. 6.5 g allylbromide and 20 ml hexamethylphosphoric acid triamide are subsequently successively added dropwise, and the mixture is stirred at room temperature for 4 hours and worked up as described in Example 1. By chromatography on Kieselgel with hexane and diethyl ether (4:1 parts by volume), there is obtained pure allyl-(7-ethyl-3,11-dimethyl-2,6,10-tridecatrienyl)-ether (cis and trans-mixture). Boiling point 93°C/.001 mmHg; $n_D^{20} = 1.4800$.

5.2 g N-bromosuccinimide is added portionwise with ice-cooling to a homogeneous solution of 8.34 g allyl-(7-ethyl-3,11-dimethyl-2,6,10-tridecatrienyl)-ether (cis and trans-mixture) in 82 ml tetrahydrofuran and 13 ml water. The mixture is further stirred under ice-cooling for 6 hours and worked up as described in Example I. By chromatography on Kieselgel with hexane and diethyl ether (4:1 parts by volume), there is obtained pure 4-bromo-7-ethyl-3,11-dimethyl-13-allyloxy-7,11-tridecadiene-3-ol (cis and trans-mixture). $n_D^{20} = 1.5019$

EXAMPLE 15

Roundels (10 cm²) of cotton material are drenched with an acetonic solution of the active, allyl substances of the instant invention and carefully dried. For each substance and concentration, 30–60 freshly laid eggs of the Ephestia Kuhniella are placed on the roundels and brought to hatching in a small cage of plastic at 25°C. and high humidity.

The action of the substances manifests itself in the premature or retarded death of the embryos in the egg or upon hatching. The results are expressed in % egg morality. The dosage is stated in: $10^{-x}$ g of active substance/cm² of cotton material. Thus, dosage 3 means $10^{-3}$ g/cm²

| Substance | Concn. $10^{-x}$ act. subst./cm² (dosage) | Egg mortality in % |
|---|---|---|
| 1-(allyloxy)-6,7-epoxy-3,7-dimethyl-2-octene | 3 | 100 |
|  | 4 | 100 |
| 6,7-epoxy-3,7-dimethyl-2-cis/trans-octenoic acid allyl ester | 3 | 100 |
|  | 4 | 100 |
|  | 5 | 100 |

—Continued

| Substance | Concn. $10^{-x}$ act. subst./cm² (dosage) | Egg mortality in % |
|---|---|---|
| 10,11-epoxy-3,7,11-trimethyl-2-cis/trans, 6-cis-dodecadienoic acid trans-3-methyl-2-penten-4-ynyl ester | 3 | 100 |
|  | 4 | 100 |
|  | 5 | 100 |

EXAMPLE 16

An acetonic solution of the active substance of the instant invention of known concentration is applied to the abdomen (ventral) of Tenebrio molitor pupae. The treated pupae are left at room temperature for 10 days in Petri dishes and thereafter examined as to whether adult animals have developed from the pupae. The activity of the active substance is stated in percent inhibition of the development of adult animals (AFI) (at the stated concentration).

| Substance | Concn. g act. subst./pupa | AFI in % |
|---|---|---|
| 1-(allyloxy)-10,11-epoxy-3,7,11-trimethyl-2-cis/trans, 6-cis-dodecadiene | $10^{-6}$ | 100 |
|  | $10^{-7}$ | 100 |
|  | $10^{-8}$ | 100 |
|  | $5\times10^{-9}$ | 100 |
|  | $2\times10^{-9}$ | 60 |
|  | $10^{-9}$ | 15 |

EXAMPLE 17

To 13.3 g. of 10,11-epoxy-3,7,10,11-tetramethyl-2,6-dodecadienoic acid dissolved in 200 ml. of pyridine is added 19 g. of p-toluenesulfonic acid chloride. With ice cooling, 9.6 g. of 3-methyl-pent-1-yn-4-en-3-ol is added to the mixture, which is subsequently heated for 5 hours to 40°C. The reaction mixture is poured on to water and extracted with diethyl ether, and the extract is washed several times with water. Thereafter, the ether extract is dried over sodium sulfate and evaporated.

The crude (3-methyl-pent-1-yn-4-en-yl)-10,11-epoxy-3,7,10,11-tetramethyl-2,6-dienoate obtained is purified by chromatography using 500 g. silica gel. A first fraction is eluted with n-hexane and discarded. The product is eluted with a mixture of diethyl ether/n-hexane (1:4 parts by volume), as a pale yellow oil; $n_D^{20} = 1.4860$.

We claim:

1. 1-(Allyloxy)-4,5-epoxy-1,5-dimethylhexane.

* * * * *